J. FOURNIA.
TRAIN PIPE COUPLING.
APPLICATION FILED JUNE 3, 1909.
985,155.
Patented Feb. 28, 1911.
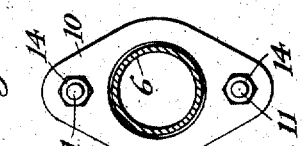
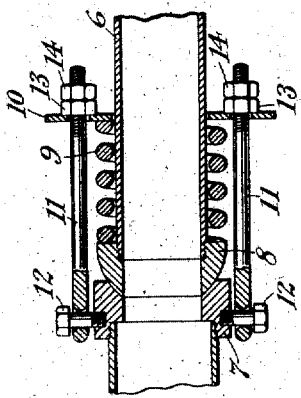
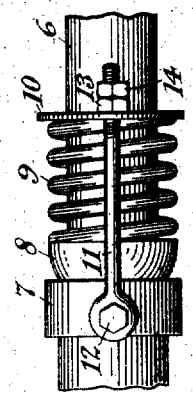
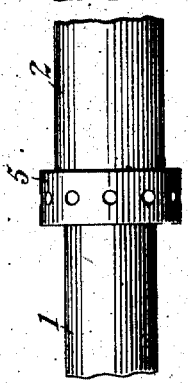
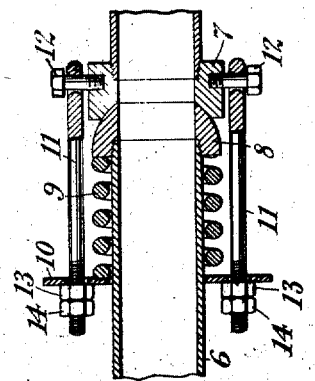
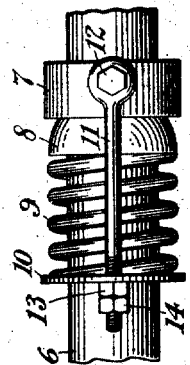
Witnesses:
Inventor
John Fournia
By his Attorney
Henry D. Williams

UNITED STATES PATENT OFFICE.

JOHN FOURNIA, OF ALBANY, NEW YORK, ASSIGNOR OF ONE-HALF TO FREDERICK RANDALL GREENE, OF ALBANY, NEW YORK.

TRAIN-PIPE COUPLING.

985,155.

Specification of Letters Patent. Patented Feb. 28, 1911.

Application filed June 3, 1909. Serial No. 499,864.

*To all whom it may concern:*

Be it known that I, JOHN FOURNIA, a citizen of the United States, residing at Albany, in the county of Albany and State of New York, have invented a certain new and useful Improvement in Train-Pipe Couplings, of which the following is a specification, reference being had therein to the accompanyings, forming part thereof.

My invention relates generally to train pipe couplings for conveying water, steam or air between moving train vehicles and particularly to couplings for use between a locomotive or engine and its tender.

One object of my invention is to provide a simple, strong and tight coupling which will fully accommodate the relative movements of the cars under all conditions of use and which may be made of large cross-sectional area and conductive capacity and without drop or droop and entirely of metal.

Another object is to provide adjustable compensation for wear so that the joints may be maintained with the parts tightly seated as they are worn down, thus assuring great durability.

Other objects are simplicity and economy in manufacture and maintenance, and ease and reliability of operation.

Other objects and advantages of my invention will appear from the following description.

I shall now describe my invention with reference to the accompanying drawings and shall thereafter point out my invention in claims.

Figure 1 is a central vertical section of a coupling embodying my invention. Fig. 2 is a plan view of the same. Fig. 3 is an end view of the same with the train pipe in section.

The coupling shown in the drawings is such as would be employed between a locomotive or engine and its tender and is not required to be uncoupled except in the shop. In all ordinary train handling this coupling would remain connected.

To provide for the longitudinal movement between the engine and tender, both on straight sections of track and on curves, two straight pipe sections 1 and 2 are employed, the pipe section 1 telescoping within the pipe section 2, with a slip joint, so that the movement is unrestrained. The joint is made tight by a stuffing-box connection carried by the outer pipe section 2 and comprising a packing gland 5 screwing over a threaded enlargement 3 at the end of the pipe section 2 and containing and compressing a suitable packing 4. The gland may contain a plurality of holes or sockets to receive a key or wrench as shown. The joint is maintained as a tight joint in all positions and the pipes slip freely relatively to each other to occupy any position which the relative position of the train vehicles may require.

A permanent joint is provided between the telescopic pipe sections 1, 2, and the train pipes or engine and tender pipes 6, 6, which provides for a very considerable swing in a horizontal direction such as will accommodate the sharpest curves of the roadbed and a moderate swing in a vertical direction such as will accommodate any possible variations of level or tilting between the locomotive or engine and its tender. Each of these flexible joints is of identical construction, although the arrangement of the respective joints is opposite or symmetrical relative to the center of the coupling, and therefore a description of one will suffice for both.

Each flexible joint comprises primarily a socket member 7, which is secured to and is shown as screwed upon the end of the pipe section and has a spherical socket, and a ball member 8 which is secured to and is shown as screwed upon the end of the train pipe 6. The ball member fits nicely against the spherical socket, with a large freedom of angular movement, and the two parts of this ball and socket joint are tightly held together under all conditions and in all positions of use and with abundant compensation for wear by resilient means, which I will now describe.

A helical thrust spring 9 surrounds the train pipe 6 and bears at one end against the end of the ball member and at the other end against a bearing member consisting of a plate loosely fitted over the train pipe so that it may be tilted or turned angularly thereon to a moderate extent and may also freely move longitudinally thereon both for adjustment and in taking up the wear of the ball and socket members. This bearing plate 10 is connected to the socket member 7 by tension-resisting means consisting of rods or eye-bolts 11 located vertically above and below the center line of the coupling and having eyes which somewhat loosely engage trunnions or studs 12 projecting from the socket member 7, these eye-bolts passing freely through somewhat enlarged holes in the bearing plates and having nuts 13 abutting against the bearing plate 10. The eyes of the eye-bolts are shown as universally rounded to prevent binding or jamming in any position. Additional or jam nuts 14 are provided to insure against accidental loosening of the nuts 13, or lock nuts could be provided, although ordinarily the thrust of the spring 9 will hold the nuts tightly in adjusted position. The thrust of the spring 9 is sufficiently strong to hold the parts in the position in which they are set, with the eye-bolts 11 vertically above and below the center line of the coupling; and the angular movement of the joint as the train passes around curves tends to correct any slight deviation from the vertical. A very considerable thrust must be developed in the springs to initially hold the joint tight, and the springs are apt to become weakened in use and the spherical bearings are subjected to considerable wear in use, but the provision of the means for adjusting the tension of the spring permits the parts to be assembled with the springs under slight, if any, tension, and thereafter the tension to be applied by tightening the nuts 13, both for initial adjustment and for compensation in service.

The connection of the eye-bolts 11 with the socket member 7 is a pivotal connection permitting the socket member to turn on a vertical axis to a large extent amply sufficient to accommodate the angular movement resulting from the sharpest curve of the roadbed. This turning movement will be accompanied by some lateral movement of the trunnions or studs 12, since in the construction shown they are not in vertical alinement with the center of the ball joint, but this will be accommodated by the play at the connection of the bolts with the bearing plate 10 and by the play of the plate itself upon the train pipe 6. The relative vertical and tilting movements of the cars will be fully accommodated by the play at the connections between the eye-bolts 11 and studs 12, between the eye-bolts 11 and the bearing plates 10, and between the bearing plates 10 and the train pipes 6. Thus the pipe sections may turn upon the train pipes universally to the extent of movement required in their use. A tight joint is at all times maintained and the contacting parts of the ball and socket may wear down to a considerable extent, and will still be held tightly in contact. The absence of any packing gland at the ball and socket joints is a distinct advantage, in simplicity of construction, durability, and automatic compensation for wear.

It is obvious that various modifications may be made in the construction shown and above particularly described within the principle and scope of my invention.

I claim:

1. In a train pipe coupling, in combination, a coupling pipe, a train pipe, and a ball and socket joint between the two pipes comprising a ball member on one pipe, a socket member on the other pipe, an exteriorly arranged thrust spring engaging one of the members, bearing means receiving the thrust of the spring, and tension-resisting means connected to the bearing means for longitudinal adjustment and pivotally connected to the other member on a substantially vertical axis.

2. A train pipe coupling comprising telescopic sections having a slip joint to accommodate longitudinal extension and contraction of the coupling, train pipes, independent ball and socket joints between the telescopic sections and the train pipes to accommodate angular relative movements of the train pipes and telescopic sections and for each ball and socket joint and exteriorly arranged thrust spring engaging one of the members of the joint, and bearing means receiving the thrust of the spring and pivotally connected to the other member of the joint.

3. A train pipe coupling comprising telescopic pipe sections having a slip joint to accommodate all longitudinal extension and contraction of the coupling, train pipes, independent ball and socket joints between the telescopic sections and the train pipes, and resilient means for each ball and socket joint for maintaining a tight joint between the ball and socket, such resilient means being pivotally connected to one of the parts of the joint on a substantially vertical axis and engaging the other part of the joint with moderate play for angular movement on a horizontal axis.

4. A train pipe coupling comprising telescopic pipe sections having a slip joint to accommodate longitudinal extension and contraction of the coupling, train pipes, and ball and socket joints between the telescopic sections and the train pipes, each ball and socket joint comprising a spring engaging one of the parts of the ball and socket joint and a bearing member for the spring having a tension-resisting pivotal connection on a substantially vertical axis to the other part of the ball and socket joint.

5. A train pipe coupling comprising telescopic pipe sections to accommodate longitudinal extension and contraction of the coupling, train pipes, ball and socket joints between the telescopic sections and the train pipes, each ball and socket joint comprising a helical thrust spring encircling one of the pipes and engaging one of the parts of the ball and socket joint, a bearing plate loosely mounted on said pipe and receiving the thrust of the spring, and tension-resisting means extending from the plate to a pivotal connection with the other part of the ball and socket joint.

6. A train pipe coupling comprising telescopic pipe sections to accommodate longitudinal extension and contraction of the coupling, train pipes, and ball and socket joints between the telescopic sections and the train pipes, each ball and socket joint comprising a ball member on the train pipe, a socket member on the telescopic section, a helical thrust spring encircling the train pipe and engaging the ball member, a bearing plate loosely mounted on the train pipe and receiving the thrust of the spring, and bolts connected with the bearing plate and having eyes pivotally engaging studs on the socket member.

7. In a train pipe coupling, in combination, a coupling pipe, a train pipe, and a ball and socket joint between the two pipes comprising a ball member on one pipe and a socket member on the other pipe, resilient means arranged exteriorly of the pipes for maintaining a tight joint between the ball and socket, such resilient means being pivotally connected to one of the members on a substantially vertical axis and engaging the other member, and means to adjust the tension of the resilient means.

8. In a train pipe coupling, in combination, a coupling pipe, a train pipe, and a ball and socket joint between the two pipes comprising a ball member on one pipe, a socket member on the other pipe, and resilient means for tensionally holding the ball and socket members together, such resilient means being pivotally connected to one of the members on a substantially vertical axis and engaging the other member with moderate play for angular movement on a horizontal axis.

9. In a train pipe coupling, in combination, a coupling pipe, a train pipe, and a ball and socket joint between the two pipes comprising a ball member on one pipe, a socket member on the other pipe, a helical thrust spring encircling one of the pipes and engaging one of the members, a bearing plate loosely mounted on said pipe and receiving the thrust of the spring, and tension-resisting means extending from the plate to a pivotal connection with the other member.

10. In a train pipe coupling, in combination, a coupling pipe, a train pipe, and a ball and socket joint between the two pipes comprising a ball member on one pipe, a socket member on the other pipe, a helical thrust spring encircling one of the pipes and engaging one of the members, a bearing plate loosely mounted on said pipe and receiving the thrust of the spring, and bolts connected with the bearing plate and having eyes pivotally engaging studs on the other member.

11. A train pipe coupling comprising telescopic pipe sections having a slip joint to accommodate longitudinal extensions and contractions of the coupling, train pipes, and independent ball and socket joints between the telescopic sections and the train pipes to accommodate angular relative movements of the train pipes and telescopic sections, each joint comprising a ball member on one pipe, a socket member on the other pipe, an exteriorly arranged thrust spring engaging one of the members, bearing means receiving the thrust of the spring, and tension-resisting means connected to the bearing means for longitudinal adjustment and pivotally connected to the other member on a substantially vertical axis.

12. A train pipe coupling comprising telescopic pipe sections having a slip joint to accommodate longitudinal extensions and contractions of the coupling, train pipes, and independent ball and socket joints between the telescopic sections and the train pipes to accommodate angular relative movements of the train pipes and telescopic sections, each joint comprising a ball member on one pipe, a socket member on the other pipe, a helical thrust spring encircling one of the pipes and engaging one of the members, a thrust-plate receiving the thrust of the spring, and tension-resisting means connected to the thrust-plate for longitudinal adjustment and connected to the other member pivotally on a substantially vertical axis.

13. In a flexible pipe-coupling, in combination, mating pipes, and a ball and socket joint between said pipes comprising a ball member on one pipe, a socket member on the other pipe, a helical thrust spring encircling one of the pipes and engaging one of the members, a bearing ring loosely mounted on said pipe and receiving the thrust of the spring, and tension resisting means extending from said ring to a pivotal connection with the other member.

14. In a flexible pipe coupling, in combination, mating pipes and a ball and socket joint between said pipes comprising a ball member on one pipe, a socket member on the other pipe, a helical thrust spring encircling one of the pipes and engaging one of the members, a bearing ring loosely mounted on said pipe and receiving the thrust of the spring, tension resisting means extending from said ring to a pivotal connection with the other member, and means to adjust the tension of said spring.

In testimony whereof I have affixed my signature in presence of two witnesses.

JOHN FOURNIA.

Witnesses:
FREDERICK R. GREENE,
FREEMAN S. ARNOLD.